No. 742,151. PATENTED OCT. 27, 1903.
E. BEER & F. CRANE.
BEET HARVESTER.
APPLICATION FILED MAY 4, 1903.
NO MODEL. 3 SHEETS—SHEET 1.
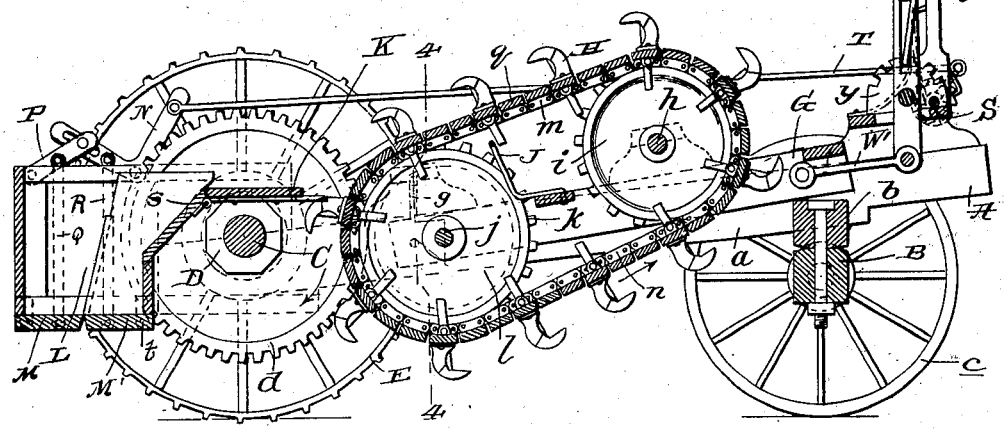
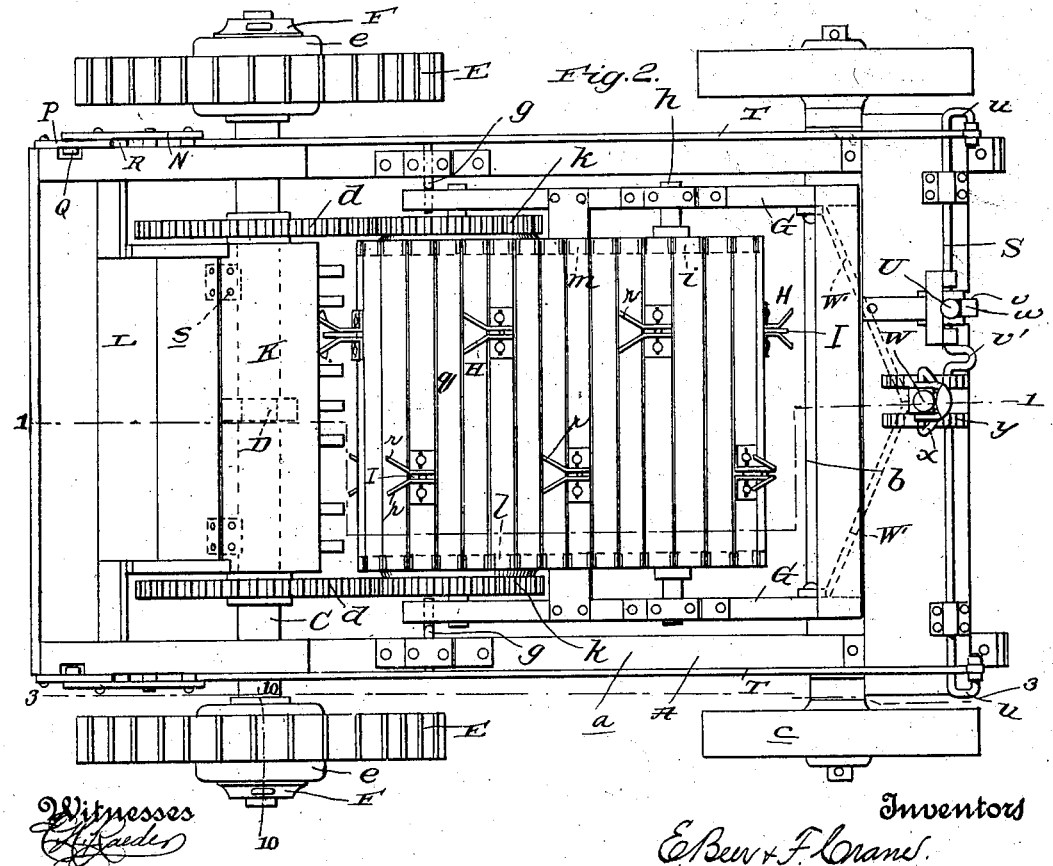

No. 742,151. PATENTED OCT. 27, 1903.
E. BEER & F. CRANE.
BEET HARVESTER.
APPLICATION FILED MAY 4, 1903.
NO MODEL. 3 SHEETS—SHEET 2.
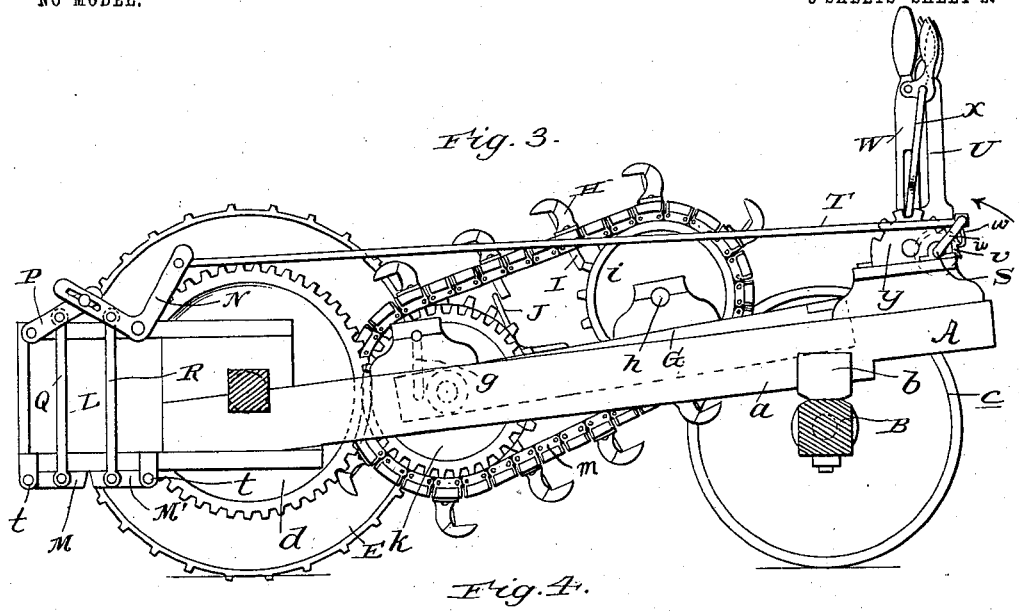
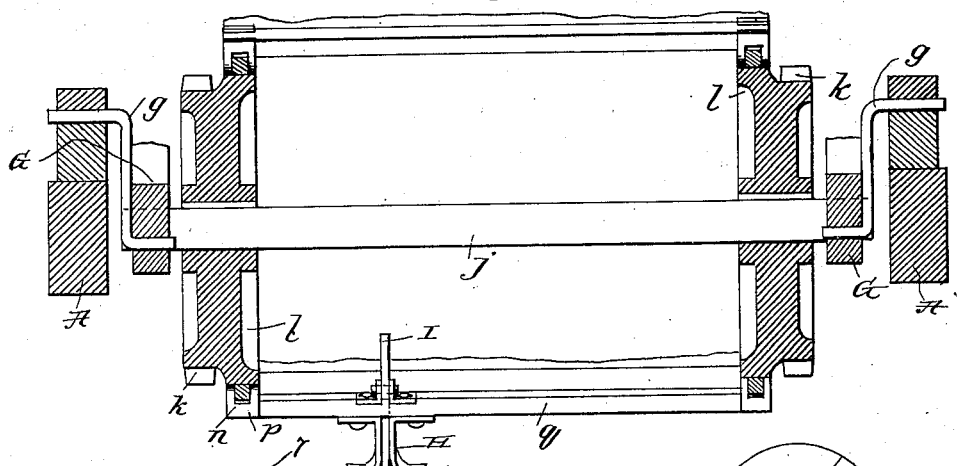
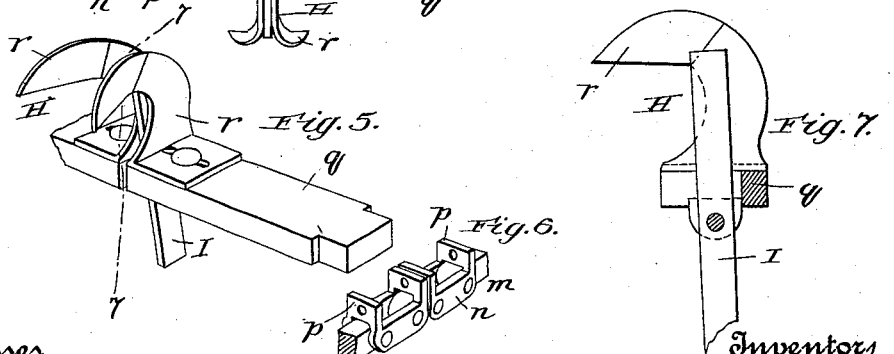
Witnesses
Inventors
E. Beer & F. Crane
by James J. Shuhy
Attorney

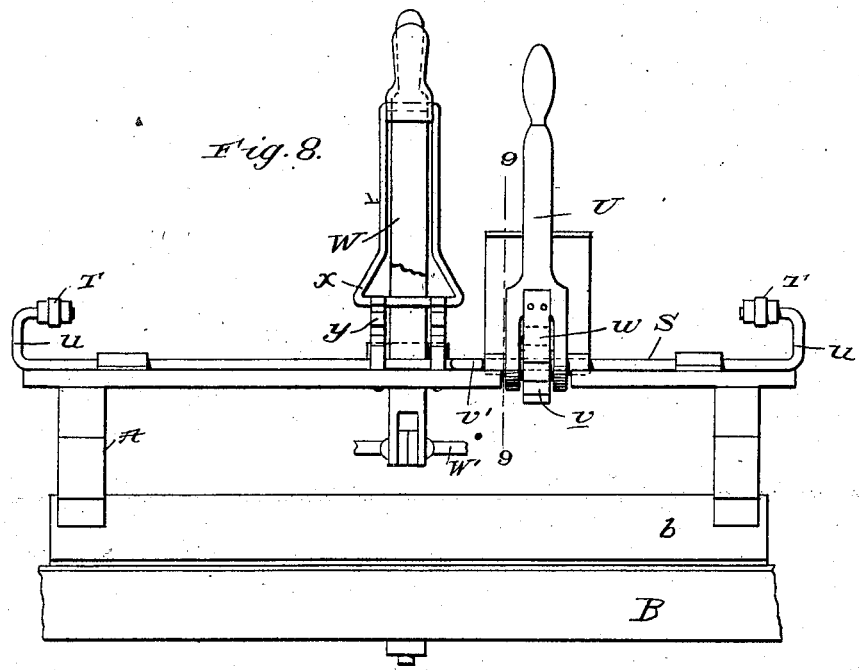
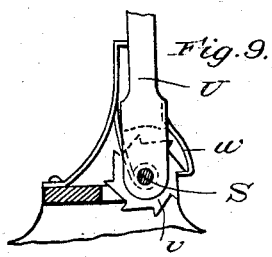
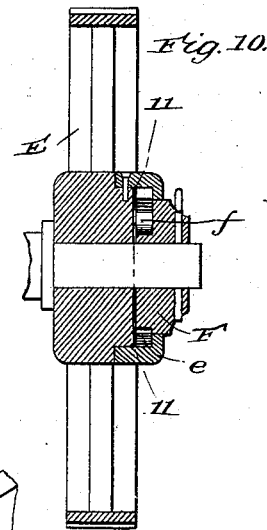
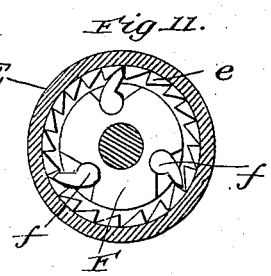
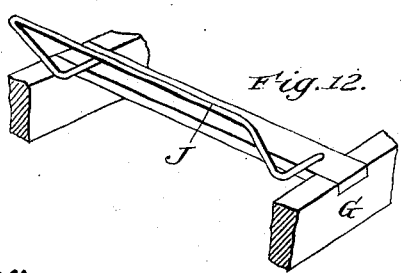

No. 742,151.    Patented October 27, 1903.

UNITED STATES PATENT OFFICE.

EPHRAIM BEER AND FRANK CRANE, OF FORT COLLINS, COLORADO, ASSIGNORS OF ONE-HALF TO MURRAY M. ST. CLAIR AND ANDREW WICKSTROM, OF FORT COLLINS, COLORADO.

BEET-HARVESTER.

SPECIFICATION forming part of Letters Patent No. 742,151, dated October 27, 1903.

Application filed May 4, 1903. Serial No. 155,656. (No model.)

*To all whom it may concern:*

Be it known that we, EPHRAIM BEER and FRANK CRANE, citizens of the United States, residing at Fort Collins, in the county of Larimer and State of Colorado, have invented new and useful Improvements in Beet-Harvesters, of which the following is a specification.

Our invention relates to machines for harvesting beets and other bulbous vegetables, and has for one of its objects to provide a machine adapted to expeditiously gather beets and similar vegetables without puncturing or otherwise injuring the roots thereof.

Another object is to provide a vegetable-harvesting machine embodying means whereby the driver is enabled to conveniently discharge the gathered vegetables at intervals.

Another object is to provide in a vegetable harvesting machine means whereby the driver is enabled to quickly and easily throw the vegetable-raising mechanism into and out of operation.

Other advantageous features of the invention will be fully understood from the following description and claims when taken in connection with the accompanying drawings, in which—

Figure 1 is a longitudinal vertical section of the machine constituting the preferred embodiment of our invention, the section being taken on broken line 1 1 of Fig. 2; Fig. 2, a top plan of the same; Fig. 3, a longitudinal vertical section taken in the plane indicated by the broken line 3 3 of Fig. 2; Fig. 4, an enlarged detail transverse section taken in the plane indicated by broken line 4 4 of Fig. 1; Fig. 5, an enlarged perspective illustrating a portion of one of the slats or cross-bars of the beet raiser or elevator and a beet-grasper and a beet-displacer thereon; Fig. 6, an enlarged perspective of a portion of one of the chain belts of the elevator; Fig. 7, a vertical section taken on broken line 7 7 of Fig. 5; Fig. 8, a detail front elevation of the machine, illustrating the lever for effecting the discharge of the gathered beets and the lever for throwing the beet-elevating mechanism into and out of operation; Fig. 9, a detail vertical section taken in plane of broken line 9 9 of Fig. 8; Fig. 10, an enlarged detail transverse section taken in the plane of the broken line 10 10 of Fig. 2; Fig. 11, a section taken at right angles to Fig. 10 in the plane of broken line 11 11 thereof, and Fig. 12 a detail perspective view of the tappet for operating the beet-displacing levers of the beet-elevator.

Similar letters of reference designate corresponding parts in all of the several views of the drawings, referring to which—

A is the main frame of our improved machine, which preferably comprises side bars $a$ and a front cross-bar $b$; B, a front axle pivotally connected to the bar $b$ and bearing supporting-wheels $c$; C, a rear axle journaled in bearings on the side bars of the frame and having spur-gears $d$ fixed thereon at points between and adjacent to said side bars; D, an angular cam, preferably octagonal, fixed on axle C midway between the gears $d$; E E, Figs. 2, 10, and 11, drive-wheels loosely mounted on spindles at the ends of axle C and having interiorly-toothed rings $e$ at their outer sides, and F F, Figs. 2, 10, and 11, disks fixed to the spindles of axle C and carrying pawls $f$, arranged to engage the teeth of the rings $e$. The teeth $e$ and pawls $f$ are relatively arranged, as shown in Fig. 11, and hence it will be observed that when the machine is drawn forwardly the wheels E will turn the axle C, while when the machine is backed said wheels E will turn loosely on the axle.

G, Figs. 1, 2, and 3, is the adjustable frame of the beet-elevating mechanism. Said frame bears at its forward end on the cross-bar $b$ of the main frame A, and its rear end is hung from the side bars of the main frame through the medium of links $g$, adapted to swing in the direction of the length of the machine.

In addition to the frame G the beet-elevating mechanism comprises a forward transverse shaft $h$, journaled in bearings on the side bars of the frame and bearing sprocket-wheels $i$, a rear transverse shaft $j$, journaled in bearings on the side bars of the frame and bearing spur-gears $k$, intermeshed with the gears $d$ and sprocket-wheels $l$, preferably formed integral with the gears $k$, sprocketbelts $m$, arranged on the sprocket-wheels $i\ l$ and having links $n$, Fig. 6, provided with upwardly-extending flanges $p$, cross-bars or slats $q$, preferably of wood, extending from one chain $m$ to the other and having reduced ends secured between the flanges $p$ of the chain-links, beet-graspers H, carried by the cross-bars or slats, and beet-displacing levers I, fulcrumed on the cross-bars or slats and extending above and below the same. The graspers H respectively comprise a pair of hooks $r$, of spring-steel or other suitable material, connected to a cross-bar or slat, preferably so that they may be fixed at various distances apart and having their outer ends inclined outwardly, Fig. 5. One of the beet-displacing levers I is arranged between the hooks $r$ of each grasper H, as shown, for a purpose presently described.

We prefer to arrange the graspers H and their complementary displacing-levers I in two rows eighteen inches from center to center, this because it is customary to plant beets in rows eighteen inches from center to center. We desire it understood, however, that the elevating mechanism may comprise a greater or less number of rows of graspers H and displacing-levers I without involving a departure from the scope of our invention.

J, Figs. 1 and 12, is a tappet connected to the frame G and arranged in the path of the lower arms of the beet-displacing levers I; K, Figs. 1 and 2, a vertically-movable platform hinged at $s$ and arranged on the cam D, so as to be oscillated thereby; L, a beet-receptacle carried by the main frame and arranged to receive from the platform K; M M', sections hinged at $t\ t$ and constituting the bottom of the receptacle L; N N, bell-crank levers fulcrumed on the side bars of the main frame and having slots in their rear arms; P P, levers fulcrumed at their rear ends on the side bars of the main frame and connected to the rear arms of the bell-crank levers by pins disposed in the slots in said rear arms; Q Q, links connecting the bottom-section M and the levers P; R R, links connecting the bottom-section M' and the rear arms of the bell-crank levers N; S, a transverse rock-shaft journaled in suitable bearings on the forward portion of the main frame and having a crank $u$ at its ends, a ratchet-disk $v$ at an intermediate point of its length, and a crank $v'$ adjacent to said disk; T T, rods connecting the forward arms of the bell-crank levers N and the cranks $u$ of the shaft S, and U a hand-lever fulcrumed on the shaft S and carrying a detent $w$, engaging the ratchet-disk $v$. When the hand-lever U is moved in the direction indicated by arrow, Fig. 3, the detent $w$ engaging the teeth of the disk $v$ will rock the shaft S in the same direction, while when the lever U is moved in the direction opposite to that indicated by arrow the detent will ride over the teeth of the ratchet. The rocking of the shaft S in the direction indicated by arrow will, through the rods T, bell-crank levers N, levers P, and links Q R, force the bottom-sections M M' of the beet-receptacle L down into an open position and effect the discharge of beets from said receptacle to the ground. To close said bottom-sections M M' subsequent to the discharge of beets, the driver seated on the driver's seat, which we have deemed it unnecessary to illustrate, has but to press with his foot on the crank $v'$ of the shaft S, so as to rock said shaft in the direction opposite to that indicated by arrow in Fig. 3. When the bottom-sections M M' of the beet-receptacle are closed, as stated, it will be observed that they will remain closed against the weight of the beets deposited in the receptacle until the hand-lever U is again operated, as before described, this because the links Q R extend vertically from said sections M M' to the levers N and P.

In the practical operation of our improved machine it will be observed that when the machine is driven forwardly over the rows of beets the beet-elevator will be driven in the direction indicated by arrow, Fig. 1, and the platform K will be oscillated, also that the graspers H of the beet-elevator will take hold of and pull beets from the ground and carry the same upwardly and rearwardly to a point slightly in front of the platform K. When the graspers holding beets reach the latter point, the tappet J engages the lower arms of the levers J, and thereby swings the upper arms of the levers rearwardly and forces the beets out of the graspers. When the beets are thus forced out of the graspers, they will pass from the apron formed by the bars or slats $q$ to the platform K, from whence they will be quickly worked into the receptacle L. When the receptacle L is filled with beets, the bottom-sections M M' are opened, in the manner before described, to deposit the beets in a pile on the ground and then closed, after which the operation described is continued.

W, Fig. 1, is a hand-lever for enabling the driver of the machine to conveniently throw the beet-elevator out of and into operation. Said lever is fulcrumed at an intermediate point of its length on the main frame and is provided with a detent $x$, arranged to engage a segmental rack $y$, fixed on said frame. In order to put the beet-elevator out of operation, the driver has but to disengage the detent $x$ from rack $y$, rock the lever W in the direction indicated by arrow, Fig. 1, so as to draw the beet-elevator forwardly through the medium of the connections W' between the lower arm of the lever and the frame G of the elevator, and disengage the gears $k$ of the elevator from the gears $d$, and then replace the detent $x$ in engagement with the rack $y$. To put the beet-elevator in operation, the driver has but to reverse the operation just described—*i. e.*, rock the lever W in the direction opposite to that indicated by arrow, Fig. 1, and adjustably fix it in position through the medium of the detent $x$ and rack $y$.

Our improved machine may be used for pulling onions as well as beets and when provided with rows of graspers H on the slats of its elevator may also be used to advantage for harvesting potatoes.

We have entered into a detailed description of the construction and relative arrangement of the parts embraced in the present and preferred embodiment of our invention in order to impart a full, clear, and exact understanding of the same. We do not desire, however, to be understood as confining ourselves to such specific construction and arrangement of parts, as such changes or modifications may be made in practice as fairly fall within the scope of our invention as claimed.

Having described our invention, what we claim, and desire to secure by Letters Patent, is—

1. In a machine for harvesting bulbous vegetables, the combination of a main frame, wheels supporting the same, an endless vegetable-elevator carried by the frame, and having graspers, each of which is formed by two hooks, the outer portions of which are flared, and a connection between one of the wheels and the elevator for driving the latter by the former.

2. In a machine for harvesting bulbous vegetables, the combination of a main frame, wheels supporting the same, an endless vegetable-elevator carried by the frame, and having graspers, each of which is formed by two hooks, the outer portions of which are flared, levers fulcrumed on the elevator, and having outer arms disposed between the hooks of the graspers, a connection between one of the wheels and the elevator for driving the latter, and a tappet arranged in the path of and adapted to engage the inner arms of the levers.

3. In a machine for harvesting bulbous vegetables, the combination with an elevator comprising an apron, a hook-shaped grasper carried thereby, and a lever carried by the apron, and having an outer arm arranged in the grasper, of a tappet arranged to engage the inner arm of said lever.

4. In a machine for harvesting bulbous vegetables, the combination of a main frame, a driving-axle journaled therein and bearing spur-gears, a frame hung in the main frame, and adjustable toward and from the driving-axle, a vegetable-elevator carried by the adjustable frame, and comprising shafts bearing sprockets, an endless apron engaging said sprockets, vegetable-graspers carried by the apron, vegetable-displacers also carried by the apron, and spur-gears on one of the shafts arranged to engage those on the driving-axle, a tappet carried by the adjustable frame, and arranged to engage and operate the vegetable-displacers, and means for adjusting and adjustably fixing the adjustable frame.

5. In a machine for harvesting bulbous vegetables, the combination of a frame, an endless elevator provided with vegetable-grasping means, and means for displacing vegetables from the grasping means.

6. In a machine for harvesting bulbous vegetables, the combination of a frame, an elevator carried thereby, vegetable-graspers arranged on the apron; said graspers respectively comprising hook-shaped members adjustable in the direction of the width of the apron, and having flared outer portions, vegetable-displacing levers mounted between the members of the graspers, and a tappet arranged in the path of and adapted to engage said levers.

7. In a machine for harvesting bulbous vegetables, the combination of a frame, shafts journaled therein, and bearing sprocket-gears, chain belts arranged on said sprocket-gears, and having links provided with outwardly-extending flanges, cross-bars extending from one chain belt to the other, and secured at their ends between the flanges thereof, vegetable-graspers respectively comprising hook-shaped members adjustably connected to the cross-bars, and having flared outer portions, levers fulcrumed on the cross-bars, and having outer arms disposed between the members of the graspers, and a tappet carried by the frame, and arranged in the path of and adapted to engage the inner arms of the levers.

8. In a machine for harvesting bulbous vegetables, the combination of a main frame, a driving-axle journaled therein, and bearing spur-gears, a frame hung in the main frame, and adjustable in the direction of the length thereof, an elevator carried by said frame, and comprising spur-gears adapted to intermesh with those on the driving-axle, and means for adjusting and adjustably fixing the adjustable frame.

In testimony whereof we have hereunto set our hands in presence of two subscribing witnesses.

EPHRAIM BEER.
FRANK CRANE.

Witnesses:
E. STUVER,
EDWARD J. CONSIGERY.